United States Patent
Jaramillo et al.

(10) Patent No.: US 10,468,016 B2
(45) Date of Patent: Nov. 5, 2019

(54) SYSTEM AND METHOD FOR SUPPORTING AUTOMATIC SPEECH RECOGNITION OF REGIONAL ACCENTS BASED ON STATISTICAL INFORMATION AND USER CORRECTIONS

(71) Applicant: International Business Machines Corporation, Armonk, NY (US)

(72) Inventors: David Jaramillo, Lake Worth, FL (US); Neil Katz, Parkland, FL (US); Robert Smart, Hampshire (GB); Viney A. Ugave, Delray Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/950,182

(22) Filed: Nov. 24, 2015

(65) Prior Publication Data
US 2017/0148432 A1    May 25, 2017

(51) Int. Cl.
*G10L 15/00* (2013.01)
*G10L 15/26* (2006.01)
*G10L 15/22* (2006.01)
*G10L 15/06* (2013.01)

(52) U.S. Cl.
CPC .......... *G10L 15/005* (2013.01); *G10L 15/22* (2013.01); *G10L 15/26* (2013.01); *G10L 2015/0635* (2013.01); *G10L 2015/226* (2013.01)

(58) Field of Classification Search
CPC ........ G10L 15/26; G10L 15/06; G10L 15/005
USPC .......................................................... 704/235
See application file for complete search history.

(56) References Cited

U.S. PATENT DOCUMENTS

| | | | |
|---|---|---|---|
| 6,173,259 B1 * | 1/2001 | Bijl ...................... | G06F 3/16 704/235 |
| 6,424,935 B1 * | 7/2002 | Taylor ................. | G10L 15/005 704/10 |
| 6,490,557 B1 * | 12/2002 | Jeppesen .............. | G10L 15/063 704/232 |
| 7,260,534 B2 * | 8/2007 | Gandhi ................. | G10L 15/01 704/235 |
| 8,078,467 B2 | 12/2011 | Wu | |
| 8,285,546 B2 | 10/2012 | Reich | |
| 8,468,012 B2 | 6/2013 | Lloyd | |
| 8,666,740 B2 | 3/2014 | Lloyd | |
| 8,694,309 B1 * | 4/2014 | Fisher .................. | G10L 15/19 704/216 |

(Continued)

*Primary Examiner* — Shaun Roberts
(74) *Attorney, Agent, or Firm* — Cantor Colburn LLP; David Zwick

(57) ABSTRACT

Disclosed herein is a system for compensating for dialects and accents comprising an automatic speech recognition system comprising an automatic speech recognition device that is operative to receive an utterance in an acoustic format from a user with a user interface; a speech to text conversion engine that is operative to receive the utterance from the automatic speech recognition device and to prepare a textual statement of the utterance; and a correction database that is operative to store textual statements of all utterances; where the correction database is operative to secure a corrected transcript of the textual statement of the utterance from the speech to text conversion engine and adds it to the corrections database if the corrected transcript of the textual statement of the utterance is not available.

17 Claims, 5 Drawing Sheets

(56) References Cited

U.S. PATENT DOCUMENTS

| | | | |
|---|---|---|---|
| 9,135,916 B2 | 9/2015 | Nutaro | |
| 2004/0254791 A1* | 12/2004 | Coifman | G10L 15/26 |
| | | | 704/246 |
| 2005/0091274 A1* | 4/2005 | Stanford | G06F 17/30746 |
| 2009/0171690 A1* | 7/2009 | Lubarski | G06Q 10/10 |
| | | | 705/342 |
| 2011/0087491 A1* | 4/2011 | Wittenstein | G10L 15/26 |
| | | | 704/235 |
| 2011/0153324 A1 | 6/2011 | Ballinger | |
| 2015/0039299 A1* | 2/2015 | Weinstein | G10L 15/16 |
| | | | 704/202 |

\* cited by examiner

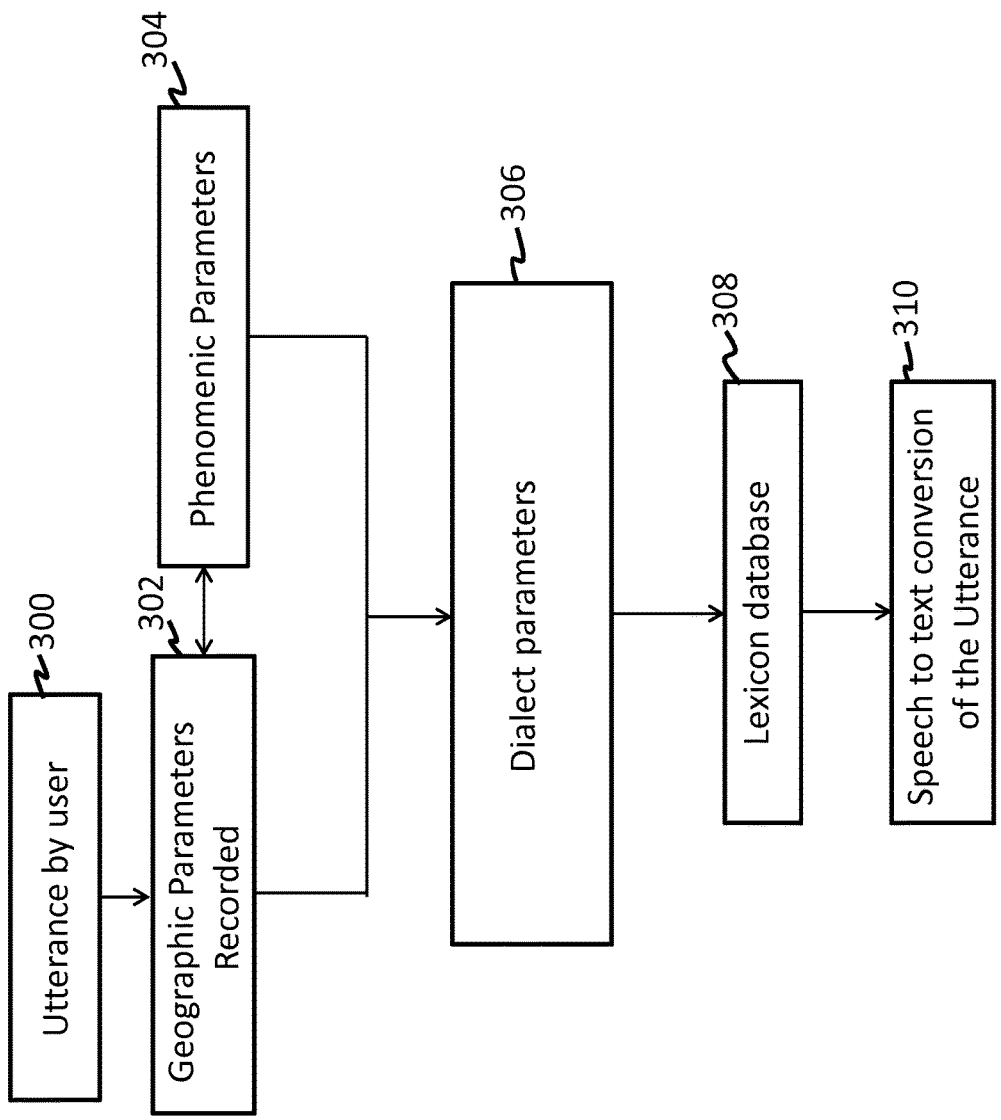

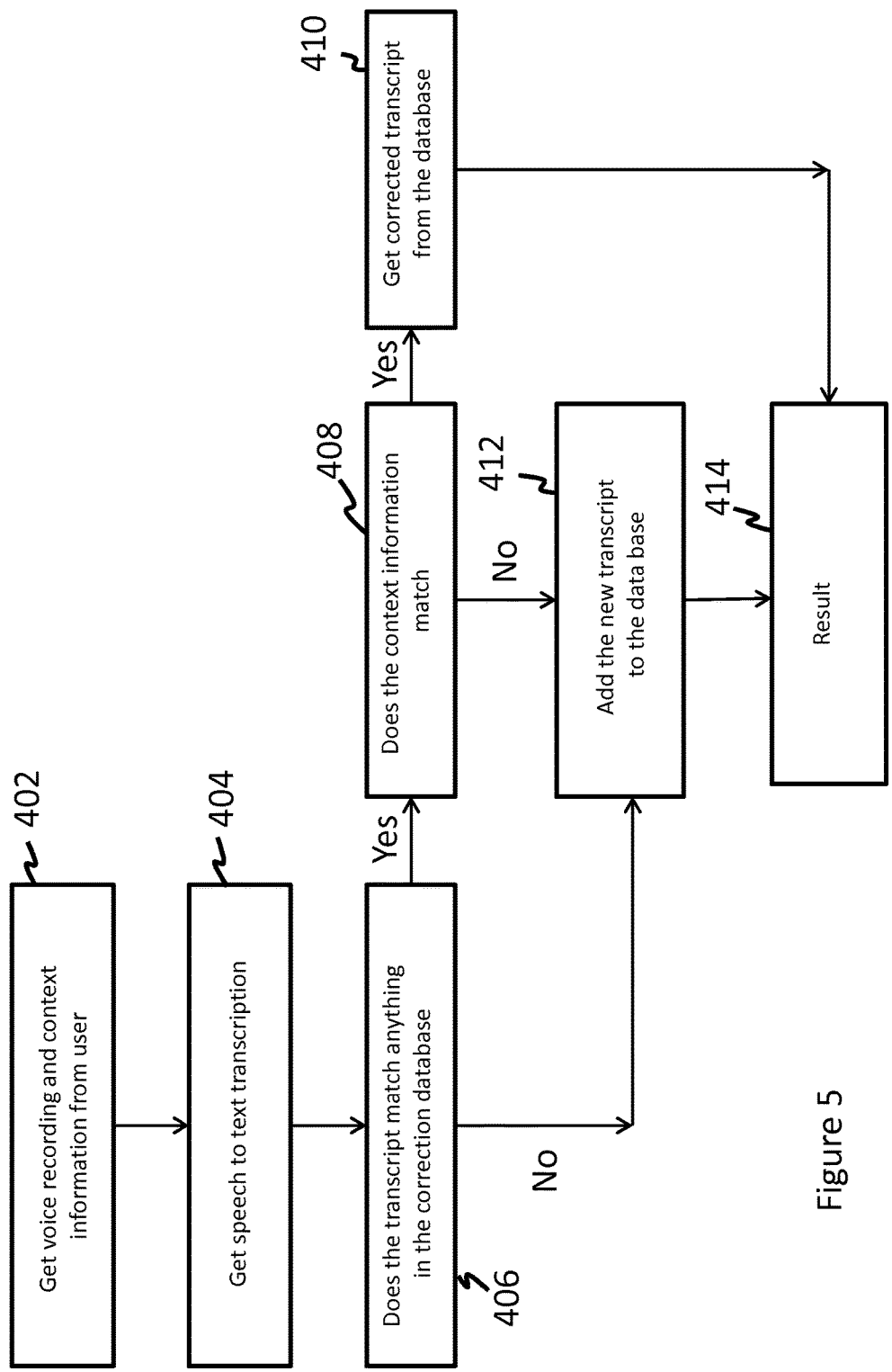

SYSTEM AND METHOD FOR SUPPORTING AUTOMATIC SPEECH RECOGNITION OF REGIONAL ACCENTS BASED ON STATISTICAL INFORMATION AND USER CORRECTIONS

BACKGROUND

This disclosure relates to a system and a method for supporting automatic speech recognition of regional accents based on statistical information and user corrections.

Automatic speech recognition (ASR) and speech-to-text conversion have been developed to generate text more rapidly while keeping the user's hands free for other tasks. Speech recognition involves hardware and software that is capable of receiving a spoken sound pattern and matching it with a particular word, phrase, or action. Speech-to-text conversion is a more elaborate system that is capable of continuously performing speech recognition but in such a manner that it is capable of converting a spoken conversation or discourse to corresponding text that is comparable to what a typist at a keyboard would do, but more rapidly. Current speech-to-text systems are capable of following a natural conversation and generating corresponding text with a relatively low rate of errors with some limitations.

One difficulty current speech-to-text systems have is correctly interpreting variations in speech when the meaning stays constant. A given person will tend to pronounce words slightly differently at different times. As they become excited, they tend to speak more rapidly. Many people tend to slur words together or to partially drop phonemes from their pronunciation. A human speaker is familiar with the vagaries of typical human speech and would readily make the correct interpretation in this case, but a machine has a more difficult time making the distinction.

Different people will tend to pronounce the same words differently and use different phrasing. Oftentimes the variations in people's speech patterns follow predictable and identifiable patterns by groups such as: the place that the speakers grew up in, their age or gender, or their profession or type of work they do. These variations in pronunciation and word use are referred to as dialects. A dialect is typically distinguished by the use or absence of certain words or phrasing. A dialect will also typically have predictable manners of pronouncing certain syllables and/or words. It can be appreciated that the predictable nature of a dialect could be used to facilitate the learning process for a speaker dependent speech-to-text converter.

Automatic speech recognition systems can work effectively for languages and accents for which a language model has been created. They do not however, fare well in areas or domains where there are a variety of strong regional accents. Current methods of coping with variations in regional accents rely on large amounts of recorded audio being processed and added to the language model. For example, automatic speech recognition language models that have a very specific domain such as, for example, the insurance industry are used by a restricted group of people and are therefore successful. However, automatic speech recognition language models do not work very well for call centers because of the large number of people calling in from different regions with problems that are not particularly linked to a specific domain.

In addition, this mass collection of audio for domain specific user groups is difficult and expensive. It is therefore desirable to provide an alternative method of improving the automatic speech recognition for certain accents based on knowledge of the user accessing the automatic speech recognition system.

SUMMARY

Disclosed herein is a system for compensating for dialects and accents comprising an automatic speech recognition system comprising an automatic speech recognition device that is operative to receive an utterance in an acoustic format from a user with a user interface; a speech to text conversion engine that is operative to receive the utterance from the automatic speech recognition device and to prepare a textual statement of the utterance; and a correction database that is operative to store textual statements of all utterances; where the correction database is operative to secure a corrected transcript of the textual statement of the utterance from the speech to text conversion engine and adds it to the corrections database if the corrected transcript of the textual statement of the utterance is not available.

Disclosed herein too is method comprising transmitting an utterance in an acoustic format to an automatic speech recognition system comprising an automatic speech recognition device that is operative to receive an utterance in an acoustic format from a mobile user with a user interface; a speech to text conversion engine that is operative to receive the utterance from the automatic speech recognition device and to prepare a textual statement of the utterance; and a correction database that is operative to store textual statements of all utterances; securing from the correction database a corrected transcript of the textual statement of the utterance from the speech to text conversion engine; and adding the corrected transcript of the textual statement of the utterance from the speech to text conversion engine to the corrections database if the corrected transcript of the textual statement of the utterance is not available.

Disclosed herein too is a computer program product comprising a non-transitory storage medium readable by a processing circuit and storing instructions for execution by the processing circuit for performing a method comprising transmitting an utterance in an acoustic format to an automatic speech recognition system comprising an automatic speech recognition device that is operative to receive an utterance in an acoustic format from a mobile user with a user interface; a speech to text conversion engine that is operative to receive the utterance from the automatic speech recognition device and to prepare a textual statement of the utterance; and a correction database that is operative to store textual statements of all utterances; securing from the correction database a corrected transcript of the textual statement of the utterance from the speech to text conversion engine; and adding the corrected transcript of the textual statement of the utterance from the speech to text conversion engine to the corrections database if the corrected transcript of the textual statement of the utterance is not available.

BRIEF DESCRIPTION OF THE FIGURES

FIG. 4 is a schematic diagram of one exemplary method for accessing records and parameters in order to correct for dialects and accents; and FIG. 5 is a schematic flow diagram that depicts the sequence of events when the system is used.

DETAILED DESCRIPTION

Disclosed herein is a method for using an automatic speech recognition system where a user with a user interface that is in communication with the ethernet (the internet) can be provided with feedback pertaining to the automatic speech recognition process in the form of a text transcript. Examples of the user interface include applications such as a smart phone, tablet or other form of a web interface. The user can then use the user interface to make corrections to the text transcript derived from the automatic speech recognition system. The corrections can then be stored with an identifying tag in the automatic speech recognition system for further use. In an embodiment, the corrected text can further be corrected by administrators or by the user (with the appropriate permissions). While the disclosure herein discusses the user as being a mobile user, it is to be understood that the user may be any person having a user interface such as, for example, an employee in an office who is seated at his/her desk and not necessarily moving around.

The automatic speech recognition system disclosed herein has a number of advantages. Because the user is accessing the automatic speech recognition system via a mobile app or web interface an attempt can be made by the speech recognition system to locate the user and identify his accent and/or dialect through a variety of different methods. This may be achieved via information available on the user's account such as the user's address, country of origin, information available on the web about the origin of the user's family name, family history, location of the user's relatives or via even more fine grained information such as the user's present location (in terms of latitude and longitude) obtained through a mobile device with a global positioning system.

When a new user from the same region speaks into a device that is in operative communication with the automatic speech recognition system, the text transcript produced for the user is compared with the results for other users from that region. If there is a close match, this correction can then be returned as the automatic speech recognition system result. The advantage of this method over current methods is that the accuracy of the automatic speech recognition system for badly supported accents can be improved for common phrases without making updates to the language model.

Figure 1:
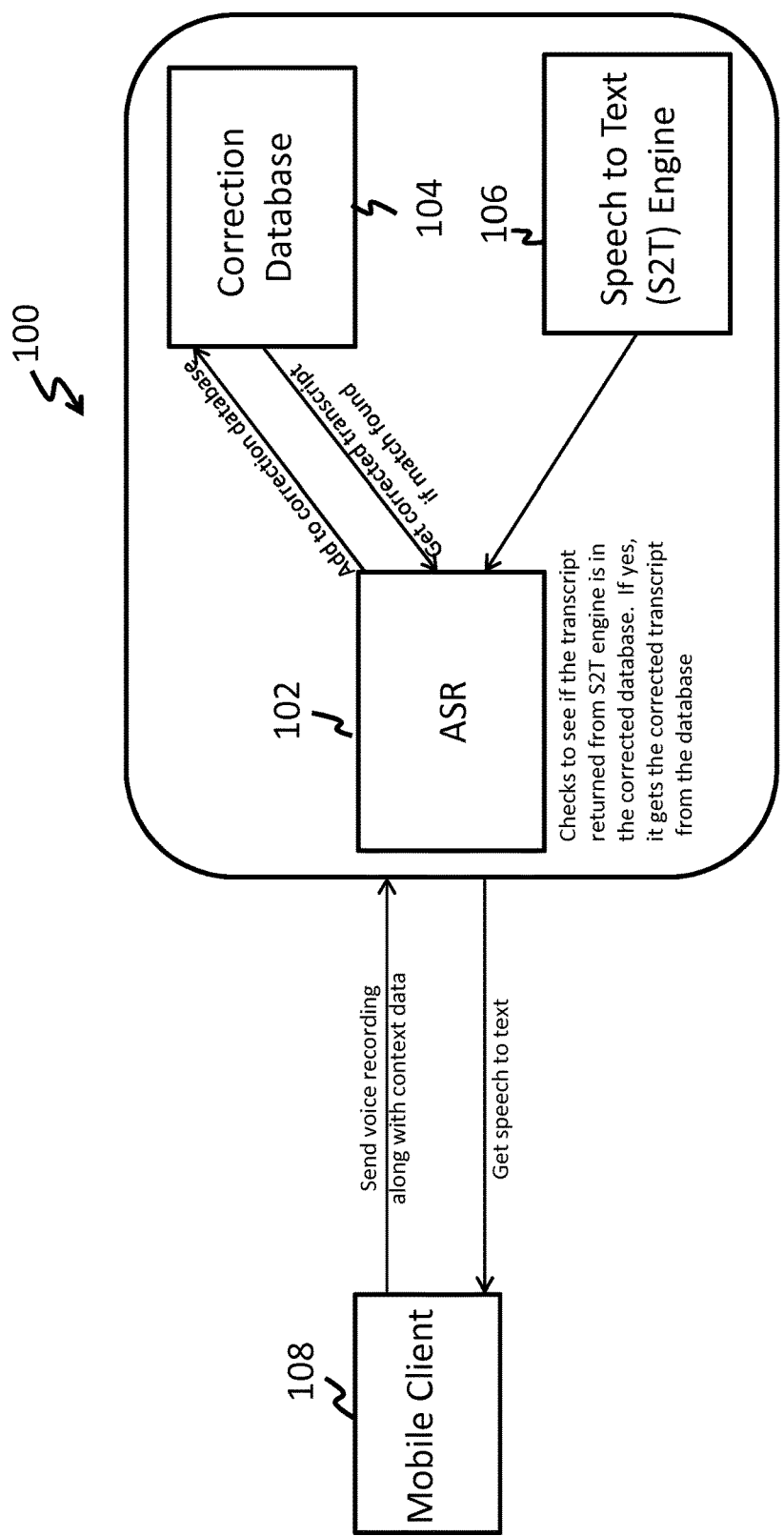
FIG. 1 is a schematic diagram of an automatic speech recognition system that comprises an automatic speech recognition device, a speech to text engine, and a correction database.

With reference now to the FIG. 1, the automatic speech recognition system 100 comprises an automatic speech recognition device 102, a speech to text engine 106, and a correction database 104. The automatic speech recognition device 102 is in operative communication with the speech to text engine 106 and with the correction database 104. In an embodiment, the automatic speech recognition device 102 is in electrical communication (e.g., a hardwired communication), electromagnetic communication (e.g., a WiFi connection that uses electromagnetic radiation such as radiofrequency waves), an electromechanical communication, or a combination thereof with the speech to text engine 106 and with the correction database 104.

A mobile user 108 in possession of a user interface (not shown) is in two-way operative communication with the automatic speech recognition system 100. The user interface can comprise a monitor, a speaker, or any other devices for delivering information to a user and to the automatic speech recognition system 100. The user interface provides queries to the user and displays the generated text resulting from the speech-to-text conversion in a manner that will be described in greater detail below. The user interface also permits the user to correct the text and to provide other contextual details to the automatic speech recognition system 100 either via an aural feedback or a textual feedback loop.

The user interface is may be in communication with the automatic speech recognition system 100 via one or more networks such as, for example, a wireless cellular network, a wireless local area network (WLAN) or Wi-Fi network, a Third Generation (3G) mobile telecommunications network, a private network such as an intranet, a public network such as the Internet, or some combination thereof).

In order to provide textual feedback the mobile user 108 may use a keyboard, mouse, touchscreen, or any other devices for providing input to a computer system. The user interface provides a means for the mobile user 108 to provide answers to queries posed by the automatic speech recognition system 100 and to correct generated text as needed in a manner that will be described in greater detail below.

Figure 2:
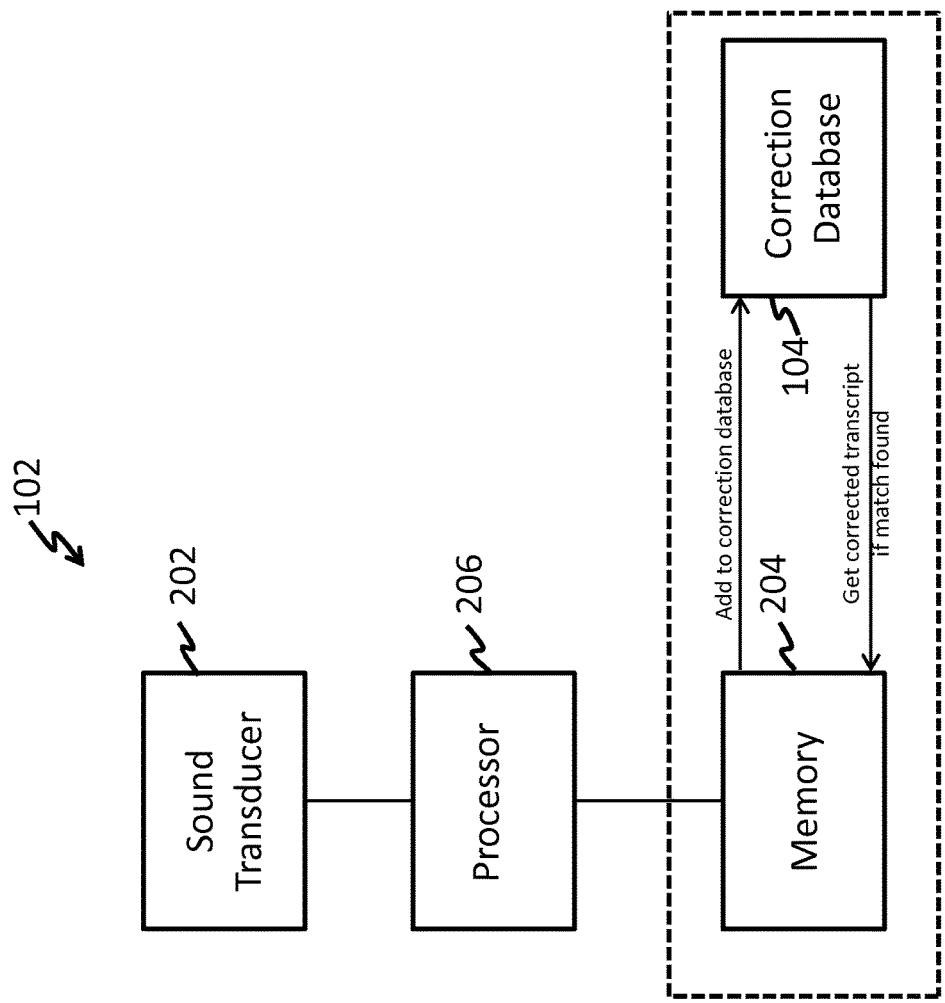
FIG. 2 is a schematic diagram of the components of the automatic speech recognition device.

With reference now to the FIG. 2, the automatic speech recognition device 102 comprises a sound transducer 202, a memory 204, and a processor 206 as shown in the FIG. 2. The sound transducer 202 is adapted to accurately transduce sounds in the normal range of human hearing from approximately 20 Hz to 20 kHz and send a corresponding analog electrical signal to the processor 206. It can be appreciated that the performance of the automatic speech recognition system 100 is dependent on the quality of the signal provided by the sound transducer 202 of the automatic speech recognition device 102.

The processor 206 is adapted to control the operation of the automatic speech recognition system 100 in a manner that will be described in greater detail below. The sound transducer 202 is in operative communication with the processor 206 and the processor 206 is provided with interface circuitry to amplify, filter, and digitize the input from the sound transducer 202.

The memory 204 stores a language model that comprises a dialect database and the learned speech patterns of the various users that interact with the system. The memory 204 can be a part of the automatic speech recognition device or can be a part of the correction database 104 as discussed below. The memory 204 is connected to the processor 206 and adapted to receive, store, and recall data to the processor 206. The memory 204 is in operative communication with the correction database 104 and adds corrections to the correction database or alternatively gets a corrected transcript from the correction database 104. In an embodiment, the memory 204 and the correction database 104 can be part of a single system, i.e., they can be a part of a single unitary device 210 as seen in the FIG. 2.

The memory 204 may be provided with an array of records and parameters that can be accessed and utilized in order to correct for dialects and accents. An exemplary system for accessing records and parameters in order to correct for dialects and accents is provided in the FIG. 3.

Figure 3:
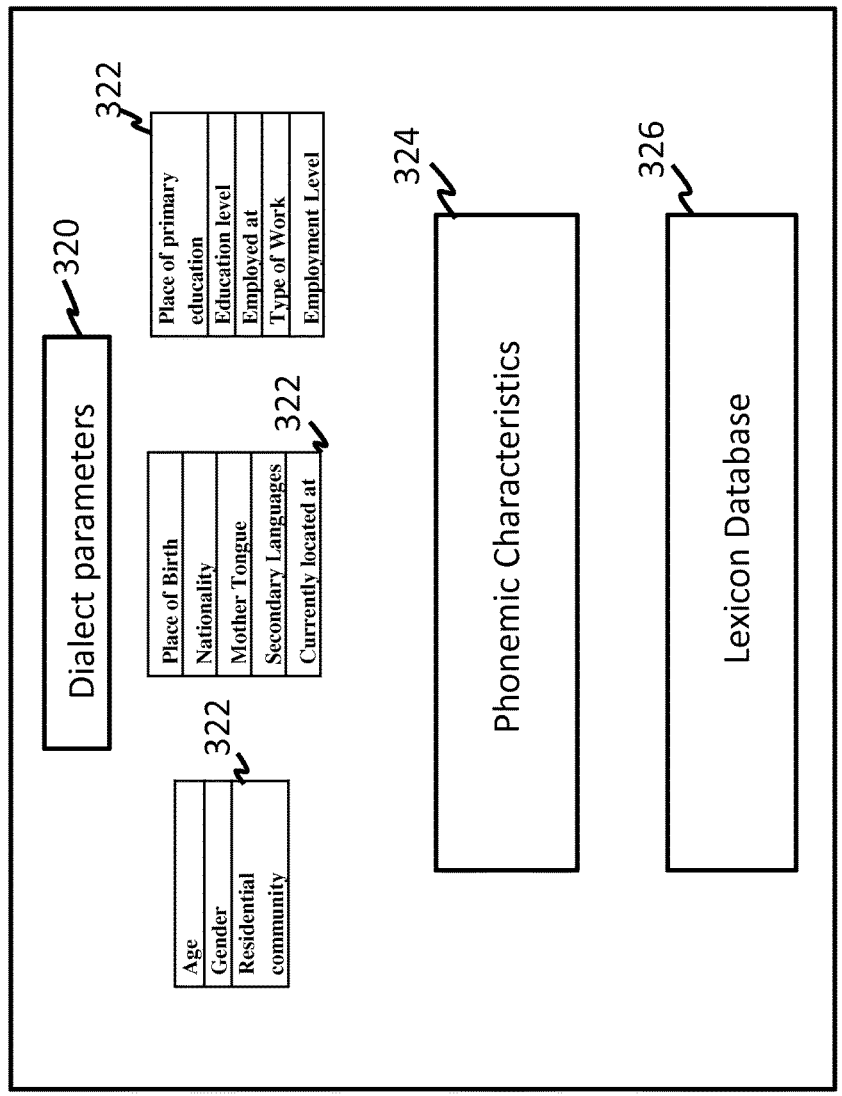
FIG. 3 is a schematic diagram of one exemplary system for accessing records and parameters in order to correct for dialects and accents.

An exemplary dialect record 320 is shown in the FIG. 3. Each dialect record 320 contains parameter structures 322 with information defining a dialect. In this embodiment, a dialect is defined by the speaker's age, gender, level of education, type of work they do, whether they are a native speaker of the language or not, if not what their native language is, where they grew up, where they currently live, and how long they have lived there. Each dialect record 320 also contains data structures 324 defining phonemic characteristics specific to that dialect. The phonemic characteristics are the typical ways speakers of a particular dialect pronounce different words and phrases. It will be appreciated that the phonemic characteristic data structure 324 may define particular rules of pronunciation relating to particular dialects. The phonemic characteristics data structure 324 may also contain frequency information for the dialects of children or adult female speakers as the frequency or pitch of their voice is generally higher than with adult male speakers and knowing this information will assist the processor 206 in correlating text words with received audio words in the manner that will be described in greater detail below.

It is to be noted that while the automatic speech recognition device 102 accesses the dialect record 320, it may also access available knowledge about the user from the World Wide Web. Sites such as www.whitepages.com; www.intellius.com, www.ancestry.com; www.linkedin.com; www.facebook.com; or the like, that can provide historical and educational information about the user can be accessed to try to ascertain the user's accent or dialect.

Each dialect record 320 may also contain a lexicon database 326 containing any words or phrases that are unique to the dialect. The lexicon database 326 may contain a complete lexicon of each recognized dialect or it may contain simply those words that are unique to a particular database that cannot be determined by the processor by applying the phonemic characteristics 324. It is understood that to determine a particular word from an audio signal, certain general rules can be applied to recognize some words, e.g., a child will generally speak in a higher pitch than an adult. Hence, to determine the word, the processor 206 may simply frequency transform the digital signal and compare it to a standard database or lexicon of words. Alternatively, there are also certain pronunciations of words that are associated with a particular dialect that are not rule based. The lexicon database 326 can either include entire dialectic pronunciations of words or it can contain a pointer to a standard lexicon and selected special case pronunciations for particular dialects.

The correction database 104 can include the memory 204 detailed above but it also performs an additional function— notably in that it stores corrected transcripts. If a correction has to be made to a word or a phrase because of the use of a dialect or accent that has not been encountered by the automatic speech recognition system 100, this correction is made by the user and this correction can be saved on the correction database 104. When such a correction is made and a corrected transcript is available on the correction database 104, it can be accessed by the automatic speech recognition device 102 from the correction database 104 and used to correct for the accent or the dialect.

The speech to text (S2T) engine 106 comprises components and operation of one or more of currently available speech recognition systems, such as, for example, Dragon Naturally Speaking™, Watson Voice Recognition Technology & Speech API from AT&T, RASR Speech Recognizer from Red Shift Company, HTML5 Chrome speech API from Google, Assistant.ai (assistant for Android, iOS and Windows Phone Assistant.ai); Indigo Virtual Assistant for Android, iOS, and WP, by Artificial Solutions; Textshark Cloud-/API-based speech-to-text transcription Speech to Text Transcription; TrulyHandsfree Embedded speech recognition for wakeup and command and control Sensory; TrulyNatural Embedded large vocabulary speech recognition for natural language Sensory; Sonic Cloud Online Speech; S-voice Samsung Galaxy's Voice based personal assistant; Verbio ASR embedded and Cloud speech recognition for natural language Embedded Speech Recognition; Dragon Dictation; Google Now Android voice search; Google Voice Search; Microsoft Cortana Microsoft voice search; GoVivace Cloud-based speech recognition Automatic Speech Recognition; Siri Personal Assistant Apple's virtual personal assistant; MeMeMe Mobile Cloud-based speech recognition; SILVIA Android and iOS; Vlingo; Jeannie Android; Ziri Android; Microsoft Tellme Windows Phone 7/8; Ask Ziggy; Windows Phone 7; fcGlobal Terminal; Vocre iOS; Utter! Voice to speech personal assistant Utter; Vestec; or the like, or a combination thereof.

The speech to text engine 106 receives an utterance from the mobile user 108 via the automatic speech recognition device 102 and translates this utterance to a text message. In an embodiment, the amplified, filtered and digitized message obtained from the processor 206 of the automatic speech recognition device 102 is received by the speech to text engine 106 which may then use the appropriate software to translate the utterance to a text message. The automatic speech recognition device 102 then checks whether a corrected transcript of the text message is available in the correction database 104. If a corrected transcript is available, then this message is retrieved in text format and sent to the mobile user 108 via the automatic speech recognition device 102.

The FIG. 4 details one method of using the automatic speck recognition system 100. It is to be noted that there are many possible methods of arranging the components—the geographic parameters recorded 302, the phonemic parameters 304, the dialect record 306 and the lexicon database 308 and the interactions there between. The FIG. 4 represents one possible arrangement. With reference now to the FIGS. 1 and 4, when a mobile user 108 makes an utterance 300 in a dialect or an accent, the automatic speech recognition system 100 first records geographic parameters 302 from the user interface. Global positioning system (GPS) data available from the user interface can be recorded by the automatic speech recognition system 100. The user interface can provide latitude and longitude data about the location of the user and this location. The user's location can be correlated with some phonemenic parameters 304 such the frequency of the voice of the user to determine whether the user is a child, an adult female speaker or an adult male speaker to reduce the number of available choices vis-à-vis different versions (accents or dialects) of the utterance.

Further correlations between the reduced number of available choices and the dialect record 306 may further narrow the number of available choices of the utterance. The available choices of the utterance can then be checked against the lexicon database 308 to further narrow the accuracy of the utterance to a final few choices. The final choices can then be converted to text 310 by the speech to text engine 106 (See FIG. 1). The automatic speech recognition device 102 checks to see if the final choices are in the corrected database 104. If these choices are available in the corrected database 104, the text version is sent to the mobile user 108. The mobile user 108 can correct the choice(s) and then transmits them to the automatic speech recognition device 100. The corrected choices are then transmitted to the correction database 104 for storage.

The system is advantageous in that a wide of different accents and dialects can be captured over time and stored on the correction database. The accuracy of the system also increases over time thus minimizing errors and also further minimizing the number of transactions between the automatic speech recognition database and the user. In addition, as correlations between the dialect parameters, phenomenic parameters and other contextual parameters increase, the system accuracy for accurately identifying a user's dialect or accent increases resulting in less transactions between different parts of the system or between the automatic speech recognition system and the user.

The system and the method disclosed herein are exemplified by the following non-limiting example.

The FIG. 5 details the working of the system 100 for a particular sample conversation that will now be detailed. FIGS. 1-4 may be consulted as references during this example. A mobile user in need of directions calls a directional service provider and requests directions to go to friends place. The automatic speech recognition system 100 at the directional service provider immediately derives location information and contextual information from the user's user interface (see step 402). The user then requests parameters to get to his friends place. The transactions between the automatic speech recognition system 100 and the user 108 (see FIG. 1) are shown in the scenarios below.

User states: I want the parameters to get to Tom's house. The pronunciation however comes across as: I want the "parah-meeters" to get to Tom's house.

The speech to text conversion engine 106 converts the speech to text and determines the sentence to be one of the following (see step 404).

A) I want the "parah-meeters" to get to Tom's house—South Asian or South Central Asian (e.g., Indian, Pakistani or Sri Lankan);

B) I want the "par-aahh-mee-taahhs" to get to Toms house—North African, West African (e.g., Sudanian or Ghanian); or C) I want the "param-itas" to get to Toms house—North American (e.g., American or Canadian)

The automatic speech recognition system 100 checks the corrections database 104 to see if such a pronunciation exists. If such pronunciations for the word "parameters" does not exist it gets saved to the corrections database 104 via steps 406 and 412 in the FIG. 5.

If such pronunciations do exist in the corrections database, then context information is examined (See step 408 of the FIG. 5.) The context information shows that the user is located in Virginia close to Blacksburg. Blacksburg has a university that has a lot of foreign-born students attending it in addition to American-born students. The dialect database determines that the student is from India by coupling information from the user interface with the dialect database and websites such as Linkedin and Intellius. The automatic speech recognition system 100 therefore offers the user one interpretation as follows: "I want the parameters (pronounced "parah-meeters") to get to Tom's house." If the user accepts the translation it can be stored in the correction database 104 via step 410 along with the other dialect parameters as being particular to this specific user and can be used in the future for other users from this geographical area of the world.

If, on the other hand, the system 100 cannot determine the user's accent from the context and location information, it may offer the user all three choices (A), (B) and (C), afforded by the speech to text conversion engine listed above. The user can either pick a choice or correct the pronunciation of the word "parameters" to an accent that he is more familiar with and send his choice back to the system 100 via step 410. In either event (i.e., whether the user accepts the choice offered him by the correction database 104 or corrects the choice offered him by the correction database 104), the database 104 is updated to reflect the user's desired pronunciation along with available dialect information (See FIGS. 3 and 4). Storing this information on the database provides a useful result 414 for further identification of accents and dialects of various users.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A system for compensating for dialects and accents comprising:
    an automatic speech recognition system comprising:
    an automatic speech recognition device that is operative to receive an utterance in an acoustic format from a user with a user interface;
    a speech to text conversion engine that is operative to receive the utterance from the automatic speech recognition device and to prepare a textual statement of the utterance;
    a processor, wherein the processor logs a location comprising latitude and longitude data associated with the user and compares the speech to text conversion obtained from the speech to text conversion engine against a dialect database to correct for accents or dialects and wherein the processor correlates the location of the user with phonemic parameters associated with the dialect database to reduce a number of choices of accents or dialects for correction, wherein the processor further obtains location data from the user interface and derives context data for the user thereof, wherein the data includes birthplace locations of the population at the location; and
    a correction database that is operative to store textual statements of all utterances, wherein the correction database is operative to secure a corrected transcript of the textual statement of the utterance from the speech to text conversion engine and adds it to the corrections database if the corrected transcript of the textual statement of the utterance is not available, wherein in response to an inability to determine a user's accent from context and location based information of the user, the transcript is corrected based on a desired pronunciation of the user;

wherein the processor accesses information about the user from one or more directory-based websites to further correlate phonemic parameters associated with the dialect database to further reduce a number of choices of accents or dialects for correction, wherein the one or more directory-based websites contain historical and educational information about the user, wherein the historical and educational information on the directory-based websites is entered onto the directory-based web sites independently from the mobile user, wherein information from the one or more directory-based websites is coupled with the data regarding the population.

2. The system of claim 1, where the automatic speech recognition device is further operative to communicate with the correction database to determine whether a corrected textual statement of the utterance is available prior to adding the corrected transcript of the textual statement of the utterance to the database.

3. The system of claim 2, where the automatic speech recognition device is further operative to communicate with the user to send to the user the speech to text conversion obtained from the speech to text conversion engine.

4. The system of claim 3, where the automatic speech recognition device further comprises a sound transducer for reducing extraneous noise and providing an acoustically accurate signal to the speech to text conversion engine.

5. The system of claim 4, where the automatic speech recognition device is further operative to query databases to obtain dialect data that provides a correlation between a user's history and his/her dialect or accent.

6. The system of claim 5, where the speech to text engine provides the user with a text conversion of his speech and where the automatic speech recognition system is operative to afford the user an opportunity to correct the text conversion of his speech.

7. The system of claim 6, where the user corrected text conversion is added to the correction database along with a tag that contains dialect information.

8. The system of claim 7, wherein the dialect database stores information defining a dialect.

9. The system of claim 8, wherein the dialect is defined by at least one of the following: the user's age, the user's gender, a level of education associated with the user, a type of work associated with the user, whether the user is a native speaker of a language associated with the utterance, where the user grew up and where the user currently lives.

10. A method comprising:
receiving, by an automatic speech recognition device, an utterance from a mobile user with a user interface;
receiving, by a speech to text conversion engine, the utterance from the automatic speech recognition device, wherein the speech to text conversion engine prepares a textual statement of the utterance;
logging, by the automatic speech recognition device, a location comprising latitude and longitude data associated with the mobile user and comparing the speech to text conversion obtained from the speech to text conversion engine against a dialect database to correct for accents or dialects;
correlating, by the automatic speech recognition device, the location of the mobile user with phonemic parameters associated with the dialect database to reduce a number of choices of accents or dialects for correction;
obtaining location data from the user interface and deriving context data for the user thereof, wherein the data includes information wherein the data includes birthplace locations of the population at the location;
accessing, by the automatic speech recognition device, information about the mobile user from one or more directory-based websites to further correlate phonemic parameters associated with the dialect database to further reduce a number of choices of accents or dialects for correction, wherein the one or more directory-based websites contain historical and educational information about the user, and wherein the historical and educational information on the directory-based websites is entered onto the directory-based websites independently from the mobile user, wherein information from the one or more directory-based websites is coupled with the data regarding the population;
storing, by a correction database, textual statements of all utterances;
securing, from the correction database, a corrected transcript of the textual statement of the utterance from the speech to text conversion engine, wherein in response to an inability to determine a user's accent from context and location based information of the user, the transcript is corrected based on a desired pronunciation of the user; and
adding the corrected transcript of the textual statement of the utterance from the speech to text conversion engine to the corrections database if the corrected transcript of the textual statement of the utterance is not available.

11. The method of claim 10, further comprising performing sound filtering for reducing extraneous noise on the user's speech and providing an acoustically accurate signal to the speech to text conversion engine.

12. The method of claim 11, where the automatic speech recognition further
queries databases to obtain dialect data that provides a correlation between a user's history and his/her dialect or accent.

13. The method of claim 12, further comprising providing the user with a text conversion of his/her speech.

14. The method of claim 13, further comprising offering the user an opportunity to correct the text conversion of his speech.

15. The method of claim 14, further comprising adding a user corrected text conversion with a tag that contains dialect information to the correction database.

16. A computer program product comprising:
a non-transitory storage medium readable by a processing circuit and storing instructions for execution by the processing circuit for performing a method comprising:
receiving an utterance from a mobile user with a user interface;
receiving the utterance from the automatic speech recognition device, wherein the speech to text conversion engine prepares a textual statement of the utterance;
logging a location comprising latitude and longitude data associated with the mobile user and comparing the speech to text conversion obtained from the speech to text conversion engine against a dialect database to correct for accents or dialects;
correlating the location of the mobile user with phonemic parameters associated with the dialect database to reduce a number of choices of accents or dialects for correction;

obtaining location data from the user interface and deriving context data for the user thereof, wherein the data includes wherein the data includes birthplace locations of the population at the location;

accessing information about the mobile user from one or more directory-based websites to further correlate phonemic parameters associated with the dialect database to further reduce a number of choices of accents or dialects for correction, wherein the one or more directory-based websites contain historical and educational information about the user, and wherein the historical and educational information on the directory-based websites is entered onto the directory-based websites independently from the mobile user, wherein information from the one or more directory-based websites is coupled with the data regarding the population;

storing textual statements of all utterances;

securing a corrected transcript of the textual statement of the utterance from the speech to text conversion engine, wherein in response to an inability to determine a user's accent from context and location based information of the user, the transcript is corrected based on a desired pronunciation of the user; and adding the corrected transcript of the textual statement of the utterance from the speech to text conversion engine to the corrections database if the corrected transcript of the textual statement of the utterance is not available.

17. The computer program product of claim 16, wherein the dialect database stores phonemic characteristic information associated with a dialect.

* * * * *